(12) United States Patent
Hou et al.

(10) Patent No.: US 10,972,309 B2
(45) Date of Patent: Apr. 6, 2021

(54) METHOD AND DEVICE FOR AUTOMATICALLY DISCOVERING CROSS-NODE SERVICE TOPOLOGY ON TRANSOCEANIC MULTIPLE SECTION SHARED PROTECTION RING

(71) Applicant: SINO-TELECOM TECHNOLOGY CO., INC., Shanghai (CN)

(72) Inventors: Lei Hou, Shanghai (CN); Zhiyuan Wu, Shanghai (CN); Hu Xie, Shanghai (CN); Lin Li, Shanghai (CN)

(73) Assignee: SINO-TELECOM TECHNOLOGY CO., INC., Shanghai (CN)

( * ) Notice: Subject to any disclaimer, the term of this patent is extended or adjusted under 35 U.S.C. 154(b) by 0 days.

(21) Appl. No.: 16/093,761

(22) PCT Filed: Nov. 28, 2017

(86) PCT No.: PCT/CN2017/113387
§ 371 (c)(1),
(2) Date: Oct. 15, 2018

(87) PCT Pub. No.: WO2018/192223
PCT Pub. Date: Oct. 25, 2018

(65) Prior Publication Data
US 2020/0328912 A1      Oct. 15, 2020

(30) Foreign Application Priority Data

Apr. 20, 2017  (CN) .................. 2017 1 02622031
Apr. 20, 2017  (CN) ............... 2017 2 04216860 U (51) Int. Cl.
*H04L 12/437* (2006.01)
*H04L 12/18* (2006.01)
(Continued)

(52) U.S. Cl.
CPC ............ *H04L 12/437* (2013.01); *H04L 12/18* (2013.01); *H04L 12/2878* (2013.01);
(Continued)

(58) Field of Classification Search
CPC .... H04J 14/0283; H04J 14/0291; H04J 3/085; H04J 2203/0042; H04J 2203/006;
(Continued)

(56) References Cited

U.S. PATENT DOCUMENTS 6,205,154 B1 * 3/2001 Schmidt .................. H04J 3/085
370/458
2001/0021049 A1 * 9/2001 De Girolamo ..... H04Q 11/0062
398/79
(Continued)

FOREIGN PATENT DOCUMENTS

| CN | 1612531 A | 5/2005 |
|---|---|---|
| CN | 101599847 A | 12/2009 |
| CN | 101104832 A | 8/2017 |

*Primary Examiner* — Wutchung Chu
(74) *Attorney, Agent, or Firm* — Global IP Services; Tianhua Gu (57) ABSTRACT

A method and a device for each network element node in a transoceanic multiplex section shared protection ring to automatically discover a cross-node service topology. According to the present invention, the method for automatically discovering a cross-node service topology comprises the following steps: at the node, generating a message containing service identification information of the node, the service identification information being used for identifying a service flow configured for a protection group; sending the message containing the service identification information through the transoceanic multiplex section shared protection ring; and at at least one of other nodes, determining a cross-node service crossing topology according to the message containing the service identification information. According to the embodiment of the present invention, by
(Continued)

adopting a data communication channel to periodically send a broadcast message and interacting with a configuration module and a protection protocol module in real time, when a fault occurs in a ring.

7 Claims, 7 Drawing Sheets

(51) Int. Cl.
*H04L 12/28* (2006.01)
*H04L 12/24* (2006.01)
*H04L 12/851* (2013.01)
*H04L 12/42* (2006.01)

(52) U.S. Cl.
CPC ...... *H04L 41/0627* (2013.01); *H04L 41/0695* (2013.01); *H04L 41/12* (2013.01); *H04L 47/2441* (2013.01); *H04L 2012/421* (2013.01)

(58) Field of Classification Search
CPC ............ H04L 41/0654; H04L 41/0677; H04L 41/0806; H04L 12/437; H04L 45/22; H04L 45/28; H04L 12/18; H04L 12/2878; H04L 41/0627; H04L 41/0695; H04L 41/12; H04L 47/2441; H04L 2012/421; H04Q 2011/0092

See application file for complete search history.

(56) References Cited

U.S. PATENT DOCUMENTS

| | | | |
|---|---|---|---|
| 2002/0097673 A1* | 7/2002 | Suzuki | H04L 12/437 370/222 |
| 2002/0181039 A1* | 12/2002 | Garnot | H04J 14/0241 398/3 |
| 2005/0122913 A1* | 6/2005 | Manganini | H04J 3/085 370/258 |
| 2012/0294603 A1* | 11/2012 | Fu | H04L 69/40 398/1 |
| 2014/0169223 A1* | 6/2014 | Kampmann | H04L 41/0668 370/258 |
| 2015/0372856 A1* | 12/2015 | Cheng | H04L 12/437 370/217 |
| 2015/0372902 A1* | 12/2015 | Giorgetti | H04L 41/0668 370/219 |

* cited by examiner

METHOD AND DEVICE FOR AUTOMATICALLY DISCOVERING CROSS-NODE SERVICE TOPOLOGY ON TRANSOCEANIC MULTIPLE SECTION SHARED PROTECTION RING

CROSS REFERENCE TO RELATED PATENT APPLICATION

The present application is the US national stage of PCT/CN2017/113387 filed on Nov. 28, 2017, which claims the priorities of the CN2017102622031 filed on Apr. 20, 2017 and CN2017204216860 filed on Apr. 20, 2017, which applications are incorporated herein by reference.

BACKGROUND OF THE PRESENT INVENTION

Field of Invention

The present invention relates to an optical synchronous digital hierarchy transmission network technology, in particular to a method and a device for automatically discovering a cross-node service topology on a transoceanic multiplex section shared protection ring.

Description of Related Arts

Synchronous Digital Hierarchy/Synchronous Optical Network (SDH/SONET) is a synchronous optical network technology which is integrated with multiplexing, line transmission and switching functions and is operated by a uniform network management system, which can greatly improve utilization rate of network resources, reduce management and maintenance expenses and realize flexible, reliable and high-efficiency network operation and maintenance, and can be widely applied to the field of wide area networks and the field of private networks. Detailed description related to optical synchronous digital hierarchy transmission network technology may be referred to standard specification ITU-T G.707 etc.

In the optical synchronous digital hierarchy transmission network technology, there is a protection ring, i.e., Multiplex Section Shared Protection Ring (MSSPRING), which can provide a service automatic recovery capability when network fault occurs (e.g., optical fibers are broken and service transmission signals have error codes). It is realized by switching all high-priority services into a low-priority service channel at a node adjacent to a fault in a ring, thereby enabling the high-priority services to bypass the fault point and retransmitting the high-priority services to a destination node through the ring. For related protocols and interaction between nodes, refer to ITU-T G.841. The multiplex section shared protection ring has strict performance requirements, the service recovery time (including time for interaction of K bytes related to all protection switching and time for completion of protection switching action of each node) is required to be less than 50 ms, and thereby the user does not feel any influence caused by protection switching in a call.

The multiplex section shared protection ring further has a special application scenario, i.e., transoceanic MS shared protection ring. The specialness of the transoceanic MS shared protection ring lies in that the physical distance between nodes may be very long (over 1500 km), and thereby the transmission time of signals in the optical fiber is too long to be neglected. During protection switching of the transoceanic MS shared protection ring, if switching actions are performed to all high-priority services according to a common multiplex section shared protection ring protection mechanism, the signals will be repetitively transmitted in a long path when bypassing the fault point (the signals will pass through long distance three times under severe situations), which will result in deterioration of protection switching performance. Therefore, the transoceanic multiplex section shared protection ring is optimized in mechanism, the protection switching actions are not uniform switching actions performed to all high-priority services at the switching node, but are protection switching actions performed only to high-priority services which are influenced by the fault at an add-drop service node. For this reason, each node in the transoceanic multiplex section shared protection ring is required to understand all cross-node service topologies on the ring, such that correct service-level switching operations can be performed during protection switching.

With respect to how to understand all cross-node service topologies, one method is to configure network element nodes one by one manually by the user, and the other method is to enable network elements to mutually share information and automatically discover the service topologies through a certain automatic mechanism.

Manual configuration has many disadvantages. The first disadvantage is that the operation is cumbersome, i.e., when the number of network element nodes in the multiplex section shared protection ring and the number of service are larger, the operation of manually configuring the cross-node service topologies is very cumbersome; and the second disadvantage is that errors easily occur, i.e., when service configuration errors occur in switching, it is very difficult for trouble shoot; and the third disadvantage is that the configuration is not flexible, i.e., when network elements or services are added into the multiplex section shared protection ring, reconfiguration is required to be performed, which will influence services.

Accordingly, it can be seen that a technical solution for automatically establishing a cross-node service topology at each node in the multiplex section shared protection ring is needed, so as to not only avoid the trouble in manually configuring the service topology, but also automatically acquire the new service topology when a new device or a new service is added, which enables the use and maintenance to be very convenient and improves the usability and reliability of the system.

SUMMARY OF THE PRESENT INVENTION

The present invention provides a method for automatically discovering a cross-node service topology on a transoceanic multiplex section shared protection ring, a plurality of user equipments are accessed to the transoceanic multiplex section shared protection ring through network element nodes, each user equipment forms network element node, each network element node generates a broadcast message, the broadcast message contains service identification information of the network element node, the service identification information is used for identifying a service flow configured for a protection group to which the network element node belongs, the service flow comprises add-drop service flow and pass-through service flow; the network element node sends the broadcast message to all network element nodes through the transoceanic multiplex section shared protection ring; each network element node acquiring the broadcast message acquires service identification information of other network element nodes from the broadcast message and determines a cross-node service crossing topology between the network element nodes; and when a network fault occurs in the transoceanic multiplex section shared protection ring, an add-drop network element node or a pass-through network element node in the service flow determines service-level ring protection switching according to the cross-node service crossing topology, the fault type and its position.

In the method for automatically discovering the cross-node service topology on the transoceanic multiplex section shared protection ring provided by the present invention, the service identification information contains a service mark and the broadcast message is generated according to the following steps: comparing protection group information and service flow information configured by user equipment at the current network element node, if the service flow information is unrelated to all protection groups, abandoning the service flow information; and if the service flow information belongs to one of the protection groups, converting the service flow information into local service identification information of the protection group; and the identification information is classified into different service flows according to one or any combination of a plurality of pieces of the following information, such that each piece of service identification information corresponds to one local service flow: a protection group identification number to which the service flow belongs, a node identification number of the current network element node in the protection group, a service timeslot that the service occupies an interface port to which the service belongs, the service capacity and information about whether the service flow is terminated at the network element node to which the service flow belongs.

In the method for automatically discovering the cross-node service topology on the transoceanic multiplex section shared protection ring provided by the present invention, modes for broadcasting the broadcast message to other network element nodes on the multiplex section shared protection ring comprise: in-band communication, in which a data communication channel for transmitting management and control information between equipments in an optical synchronous digital hierarchy transmission network is used as a physical channel; out-of-band communication, in which Ethernet interfaces between network element nodes are used as a physical channel and the content of the service identification information is packaged in an IP message and an Ethernet frame; and timed broadcasting or adopting point-to-point handshake protocols between network element nodes, in which the broadcast message is broadcasted to all other nodes only when a service flow configuration is changed at each time.

In the method for automatically discovering the cross-node service topology on the transoceanic multiplex section shared protection ring provided by the present invention, a relation table is maintained at one or more of other network element nodes on the multiplex section shared protection ring, and the relation table is used for recording network element nodes that local service flows belong to the same cross-node service.

In the method for automatically discovering the cross-node service topology on the transoceanic multiplex section shared protection ring provided by the present invention, the relation table determines the cross-node service crossing topology according to the message containing the service identification information according to the following steps:

after an update message containing the service identification information is received, inspecting local service of each network element node according to a clockwise sequence; and when the network element node is an add-drop service node of a service flow, marking the network element node as a root node of the cross-node service, and when the network element node is a pass-through node of a service flow, marking the node as a pass-through node of the cross-node service; and if it is found that the local services of a plurality of continuous network element nodes are connected end to end, merging the end-to-end connected local service flows into a same cross-node service, finding two root nodes of the cross-node service flow on the multiplex section shared protection ring along a clockwise direction, and representing the cross-node service flow by information of the two root nodes to obtain the cross-node service crossing topology; and topological information corresponds to one cross-node service flow by the following topological identification information: a start network element node identification of the cross-node service flow, a terminal network element node identification, a service timeslot that the cross-node service occupies an interface port to which the cross-node service belongs, the cross-node service capacity and information about whether the cross-node service flow is terminated at the current network element node.

The present invention further provides a device for automatically discovering a cross-node service topology on a transoceanic multiplex section shared protection ring, characterized in that the device comprises:

an optical transmitting and receiving module supporting optical synchronous digital hierarchy transmission network protocols, connected with a plurality of network element devices to form a transoceanic multiplex section shared protection ring and receive and transmit a service flow;

a configuration module supporting simple network management protocols or command-line interfaces, used for receiving configuration of service and protection group made by a user to a current network node; and a cross-node service topology automatic discovery module, connected with the optical transmitting and receiving module and the configuration module, used for packaging the configuration made by the user to the current network element node into a broadcast message containing service identification information of the current node, broadcasting the broadcast message to other network element nodes in the transoceanic multiplex section shared protection ring through a data communication channel in the optical transmitting and receiving module or Ethernet interfaces between network element nodes, unpackaging messages containing service identification information of other nodes received from the data communication channel or the Ethernet interfaces and calculating a cross-node service crossing topology through the topology discovery method, the cross-node service crossing topology containing topological identification information which is capable of uniquely identifying a cross-node service flow.

In the device provided by the present invention, the optical transmitting and receiving module is located on a line board and comprises an SDH transmission module, a service processing module, a protection protocol processing module, a service crossing matrix, an APS hardware channel and a general-purpose processor; and an optical synchronous digital hierarchy transmission network service enters the optical transmitting and receiving module through an optical fiber, photoelectric conversion is performed by the SDH transmission module to convert an optical signal into an electrical signal, the service processing unit separates service data and overhead bytes from the electrical signal, the overhead bytes which are needed by the protection protocols are transmitted into the protection protocol processing module for protection calculation through the APS hardware channel, and the service data enter the service crossing matrix for switching.

In the device provided by the present invention, the configuration module is located on a system control board and comprises an SNMP client supporting simple network management protocols, a command-line interface processing module, an SDH crossing configuration module and a protection configuration module; and a configuration of the current network element node issued by the user is transmitted to the configuration module on the system control board through an SNMP message or a command-line interface, configuration parameters are extracted after protocol processing and are transmitted to the corresponding configuration module, the crossing configuration module maintains all service crossing configurations of the current network node and the protection configuration module maintains all multiplex section shared protection ring production group configuration information of the current network element node.

In the device provided by the present invention, the cross-node service topology automatic discovery module unpackages messages containing service identification information broadcasted by other network element nodes from the overhead bytes of the synchronous digital hierarchy transmission network service, the cross-node service crossing topology is calculated through the topology discovery method, the protection protocol processing module is notified if the topology is changed, and the protection protocol processing module recalculates a protection state based on a new topology to decide whether to reconfigure a protection switching action.

Specific meanings of technical terms involved in the present invention are as follows:

Protection group information refers to multiplex section shared protection ring protection group information configured by a user at each network element node, and includes an identification number of the current protection group, an eastward service port and a westward service port occupied by the current protection group at the current network node, and a network element node identification of the current network node in the current protection group.

Service flow information refers to service information configured by a user at each network element node, and includes a service flow identification number, a service start access point, and a service terminal access point.

Network element node identification refers to a unique network element node identification which is allocated to each of network element nodes which form a multiplex section shared protection ring, wherein the network element node identifications are sequentially arranged from 1 to 15 along a clockwise direction on the ring.

Service timeslot, as an optical synchronous digital hierarchy transmission network is a time-division multiplexing transmission mechanism, refers to a time slice or a channel of a service port occupied during transmission of a service flow configured by a user. For example, a service occupies a first VC4 timeslot of an STM4 port of a network element.

As compared with the prior art, the present invention has the following beneficial effects:

1) The operation is simplified. When the number of network element nodes and cross-node services on the transoceanic multiplex section shared protection ring is larger, it is very cumbersome to manually configure a service topology, and confusion easily occurs in a configuration process, which will result in inconsistent of the cross-node service on different network element nodes, and further result in incorrect service switching configuration in protection switching. The present invention provides a method for automatically discovering the cross-node service topology and avoids the trouble in manual configuration.

2) Faults are decreased. After the service topology is manually configured, it is very difficult to troubleshoot the configuration of inconsistent cross-node services on different network element nodes, because the service is not influenced even though inconsistent incorrect configuration occurs and the inconsistent incorrect configuration can be discovered only when protection switching is performed and the system reliability is needed. Besides, since the protection ring is adopted, the protection channel usually involves a plurality of service flows of a plurality of network elements, and it is very difficult to determine an error source. The correctness of the topology output of the present invention is guaranteed by the algorithm, different network element nodes use the same mechanism and the output result is guaranteed to be consistent and predictable.

3) The configuration is flexible. With the increase of service volume, new network element devices or new services will be added to the multiplex section shared protection ring. When adopting manual configuration, the cross-node service topologies of other network element nodes on the ring all need to be reconfigured. The present invention adopts the method of broadcasting the message containing the service identification information at fixed time, the change of any network element topology or service will be updated in time to all network elements on the transoceanic multiplex section shared protection ring and trigger the recalculation of the cross-node service topology, and it is very convenient to use and maintain.

DETAILED DESCRIPTION OF THE PREFERRED EMBODIMENTS

The present invention will be further described below in detail in combination with the following specific embodiments and with reference to the drawings. Except content which is specially mentioned below, the processes, conditions, experiment methods and the like for implementing the present invention are all general knowledge and common knowledge in the art, and the present invention has no content which is specially restricted.

The main purpose of the present invention is to provide a method for automatically discovering a cross-node service topology on a transoceanic multiplex section shared protection ring, and the purpose can be realized through the following technical solution: a plurality of user equipments are accessed to the transoceanic multiplex section shared protection ring through network element nodes, at one network element node, generates a broadcast message containing service identification information of the network element node, the service identification information is used for identifying service flows which belongs to a protection group configuration, wherein the service flows may be services which are added and dropped from the current node and may also be services which are passed through from the current node; and at at least one of other nodes, determining a cross-node service crossing topology according to the message containing the service identification information. When a network fault occurs, an add-drop service node may perform correct service-level (AU-4) ring protection switching according to the topology of network element nodes of the transoceanic multiplex section shared protection ring, a fault type and a fault occurrence position, so that the protection interruption time of the service which passes through a long-distance transmission path is decreased. In the technical solution of the present invention, the service topology is established by broadcasting the message in the transoceanic multiplex section shared protection ring. Compared with the existing ring protection mode in which the service topology does not need to be acquired, after the service topology is established, the protection switching actions are not uniform switching actions performed to all of the high-priority services at the switching node, instead, protection switching actions are only performed to high-priority services which are influenced by the fault at an add-drop service node.

Preferably, in the above-mentioned method, the service identification information contains a service mark and the message is generated according to the following steps: comparing protection group information and service flow information configured by a user at the current network element node, if the service flow information is unrelated to all protection groups, abandoning the service flow information; and if the service flow information belongs to one of the protection groups, converting the service flow information into local service identification information of the protection group; and the identification information is classified into different service flows according to one or any combination of a plurality of pieces of the following information, such that each piece of service identification information corresponds to one local service flow: a protection group identification number to which the service flow belongs, a node identification number of the current network element node in the protection group, a service timeslot that the service occupies an interface port to which the service belongs, a service capacity and information about whether the service flow is terminated at the network element node to which the service flow belongs.

Preferably, in the above-mentioned method, the message containing the service identification information may be broadcast to other network element nodes on the multiplex section shared protection ring through the following two modes: in-band communication, in which a Data Communication Channel (DCC) for transmitting management and control information between equipment in an optical synchronous digital hierarchy transmission network is used as a physical channel; and out-of-band communication, in which Ethernet interfaces between network element nodes are used as a physical channel and the content of the service identification information is packaged in an IP message and an Ethernet frame. More preferably, if the distance between the network element nodes on the multiplex section shared protection ring is long, usually a data communication channel is adopted for broadcasting the local service identification information of each node. The broadcasting mode may be timed broadcasting, which is simple to realize and is strongly adaptable to different network topologies. However, broadcast messages which are repetitively sent by a great number of nodes within short time will increase the network burden of the data communication channel. More preferably, point-to-point handshake protocols may be adopted between network element nodes, and the broadcast message is broadcasted to all other nodes only when a service flow configuration is changed at each time. Therefore, the number of broadcast messages in the data communication channel can be effectively decreased.

Preferably, in the above-mentioned method, a relation table is maintained at one or more of other network element nodes on the multiplex section shared protection ring, the relation table is used for recording local service flows on which network element nodes belong to the same cross-node service, and the relation table determines the cross-node service crossing topology according to the service identification information message by the following manner: after an update message containing the service identification information is received, inspecting local service of each network element node according to a clockwise sequence; and when the network element node is an add-drop service node of a service flow, marking the network element node as a root node of the cross-node service, and when the network element node is a pass-through node of a service flow, marking the node as a pass-through node of the cross-node service; and if it is found that the local services of a plurality of continuous network element nodes are connected end to end, merging the end-to-end connected local service flows into a same cross-node service, finding two root nodes of the cross-node service flow on the multiplex section shared protection ring along a clockwise direction, and representing the cross-node service flow by information of the two root nodes to obtain the cross-node service crossing topology. The topological information corresponds to one cross-node service flow by the following topological identification information: a start network element node identification of the cross-node service flow, a terminal network element node identification, a service timeslot that the cross-node service occupies an interface port to which the cross-node service belongs, across-node service capacity and information about whether the cross-node service flow is terminated at the current network element node.

Another purpose of the present invention is to provide a device for automatically discovering a cross-node service topology on a transoceanic multiplex section shared protection ring. In order to realize purpose of the present invention, the above-mentioned device comprises:

an optical transmitting and receiving module supporting optical synchronous digital hierarchy transmission network protocols, connected with a plurality of network element devices to form a transoceanic multiplex section shared protection ring and receive and transmit a service flow; a configuration module supporting simple network management protocols or command-line interfaces, used for receiving configuration of service and protection group made by a user to a current network node; and a cross-node service topology automatic discovery module, connected with the optical transmitting and receiving module and the configuration module, used for packaging the configuration made by the user to the current network element node into a message containing service identification information of the current node, broadcasting the message to other network element nodes in the transoceanic multiplex section shared protection ring through a data communication channel in the optical transmitting and receiving module or Ethernet interfaces between network element nodes, unpackaging messages containing service identification information of other nodes received from the data communication channel or the Ethernet interfaces and calculating a cross-node service crossing topology through a topology discovery method. The cross-node service crossing topology contains topological identification information which is capable of uniquely identifying a cross-node service flow. When a fault occurs in the transoceanic multiplex section shared protection ring, the protection module in the network element node can decide to adopt what kind of protection switching actions based on the information of the cross-node service topology, so as to recover the interrupted service as soon as possible.

Preferably, in the above-mentioned device, the optical transmitting and receiving module is located on a line board and comprises an SDH transmission module, a service processing module, a protection protocol processing module, a service crossing matrix, an APS hardware channel and a general-purpose processor. An optical synchronous digital hierarchy transmission network service enters the optical transmitting and receiving module through an optical fiber, firstly photoelectric conversion is performed by the SDH transmission module to convert an optical signal into an electrical signal, then the service processing unit separates service data and overhead bytes from the electrical signal, the overhead bytes which are needed by the protection protocols are transmitted into the protection protocol processing module for protection calculation through the APS hardware channel, and the specific service data enter the service crossing matrix for switching.

Preferably, in the above-mentioned device, the configuration module is located on a system control board and comprises an SNMP client supporting simple network management protocols, a command-line interface processing module, an SDH crossing configuration module and a protection configuration module. A configuration of the current network element node issued by the user is transmitted to the configuration module on the system control board through an SNMP message or a command-line interface, configuration parameters are extracted after protocol processing and are transmitted to the corresponding configuration module, the crossing configuration module maintains all service crossing configurations of the current network node and the protection configuration module maintains all multiplex section shared protection ring production group configuration information of the current network element node.

Preferably, in the above-mentioned device, the cross-node service topology automatic discovery module unpackages messages containing service identification information broadcasted by other network element nodes from the overhead bytes of the synchronous digital hierarchy transmission network service, the cross-node service crossing topology is calculated through a topology discovery method, the protection protocol processing module is notified if the topology is changed, and the protection protocol processing module recalculates a protection state based on a new topology to decide whether to reconfigure a protection switching action.

Figure 1:
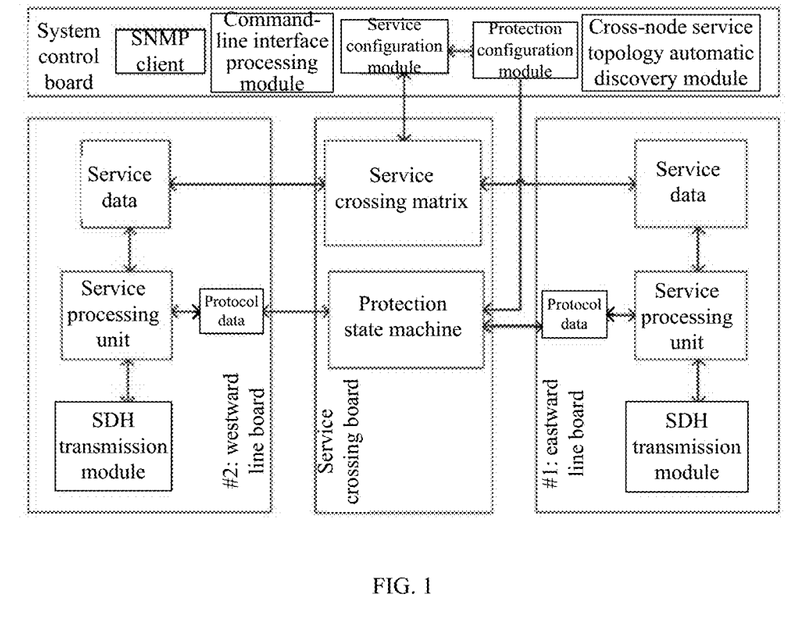
FIG. 1 illustrates a schematic diagram of a frame-type device for automatically discovering a cross-node service topology on a transoceanic multiplex section shared protection ring according to the present invention.

FIG. 1 illustrates a schematic diagram of a frame-type device for automatically discovering a cross-node service topology on a transoceanic multiplex section shared protection ring provided by the present invention. The frame-type device comprises a plurality of board cards: a system control board, a service crossing board, a westward line interface board and an eastward line interface board. An SNMP client supporting simple network management protocols, a command-line interface processing module, a service configuration module, a protection configuration module and a cross-node service topology automatic discovery module are provided on the system control board, a configuration of the current network element issued by the user is transmitted to the configuration module on the system control board through an SNMP message or a command-line interface, the service configuration module maintains all service crossing configurations of the current network node and the protection module maintains all multiplex section shared protection ring production group configuration information of the current network element node. A service crossing matrix and a protection state machine are provided on the service crossing board, and specific service crossing configuration and protection state calculation are completed here. An SDH transmission module, a service processing unit, a service data module and a protocol data processing module are provided on the line interface board. #1 line board in FIG. 1 is an eastward line interface board, #2 line board is a westward line interface board, optical synchronous digital hierarchy transmission network service enters an optical transmitting and receiving module through an optical fiber, firstly photoelectric conversion is performed by the SDH transmission module to convert an optical signal into an electrical signal, then the service processing unit separates service data and overhead bytes from the electrical signal, the overhead bytes needed by the protection protocols are transmitted into the protection state machine for protection calculation through an APS hardware channel, and the specific service data enter the service crossing matrix for switching.

Figure 2:
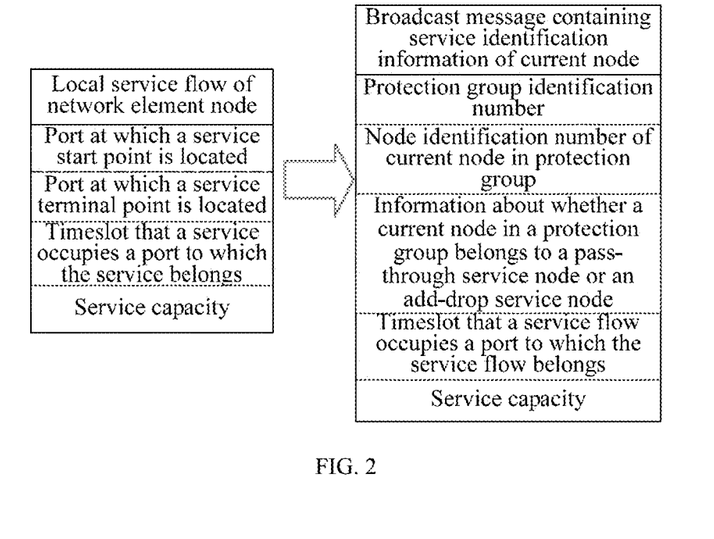
FIG. 2 illustrates a schematic diagram of generating a broadcast message containing service identification information of a current node from a local service configuration according to one embodiment of the present invention.

According to the embodiment of the present invention, the local service flows of the network element nodes may be classified according to the following classification rules: an identification of an interface port at which a start point of a service flow is located, an identification of an interface port at which a terminal point is located, a service timeslot that a service occupies an interface port to which the service belongs, and service capacity information. The service topology automatic discovery module may generate a broadcast message containing service identification information of a current node from a local service configuration according to the following methods: when a user establishes a new protection group or service configuration, each local service flow configuration is sequentially inspected, if only one of an identification of an interface port at which a start point of a service flow is located and an identification of an interface port at which a terminal point is located belongs to information configured for a certain protection group, the current network element node in the cross-node service flow of the protection group belongs to an add-drop service node; if both the identification of the interface port at which the start point of the service flow is located and the identification of the interface port at which the terminal point is located belong to information configured for a certain protection group, the current network element node in the cross-node service flow of the protection group belongs to a pass-through service node; and if neither the identification of the interface port at which the start point of the service flow is located nor the identification of the interface port at which the terminal point is located belongs to information configured for any certain protection group, the current service flow belongs to a service unrelated to the protection group, the current service flow will be skipped and a next service flow will be processed. After all local service flow configurations are queried, a broadcast message containing service identification information of the current node is filled and broadcasted to other network element nodes on a transoceanic multiplex section shared protection ring, and the broadcast message contains the following contents: identification number of the protection group, node identification number of the current network element node in the protection group, information about the current network element node in the cross-node service flow of the protection group belongs to a pass-through service node or an add-drop service node, a service timeslot that the service flow occupies the interface port to which the service flow belongs, and a service capacity, as illustrated in FIG. 2.

The in-band communication, i.e., the data communication channel adopted by the present invention mainly plays a role of providing a general-purpose service transport platform for each professional network management system, i.e., a message usually transmitted thereby is management information and state information between the network management system and the network element node. The broadcast message used in the present invention is a message containing service identification information of network element node transported between network element nodes, which exhibits the following differences from a common management information message:

1. the Sources-destinations are different: a common management information message is sent from the network management system to a network element node; and the broadcast message used in the present invention is sent from a network element node on a multiplex section shared protection ring to other network element nodes on the ring.

2. the formats are different: a common management information message complies with SNMP protocols; and the broadcast message used in the present invention is a common TCP/UDP message.

3. the contents are different: a common management information message contains user configuration management information; and the broadcast message used in the present invention contains service identification information of network element node.

4. the transmitting time is different: a common management information message is sent when a user issues a management command through the network management system; and the broadcast message used in the present invention is sent when a service configuration is changed or at fixed time.

Figure 3:
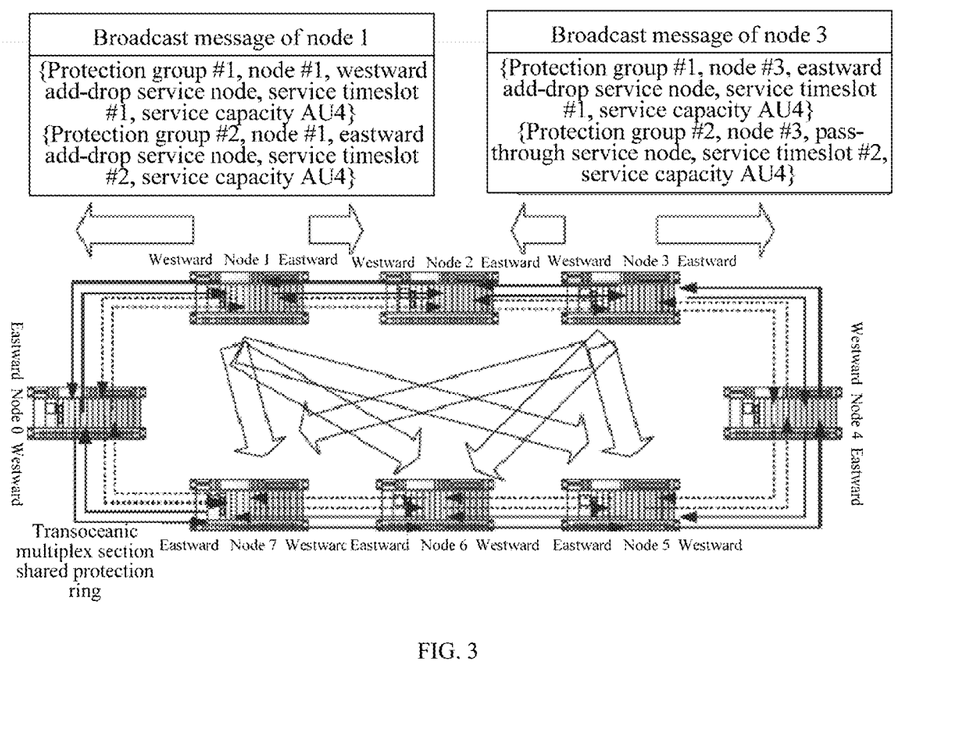
FIG. 3 illustrates a schematic diagram that a service topology automatic discovery module broadcasts a message containing service identification information of a current node at fixed time to other network elements by using a Data Communication Channel (DCC) between network element devices as a physical channel.

According to an embodiment of the present invention, a service topology automatic discovery module broadcasts a message containing service identification information of a current node at fixed time to other network elements by using a Data Communication Channel (DCC) between network element devices as a physical channel, as illustrated in FIG. 3. The data communication channel is transported through overhead bytes D1-D2 of an SDH signal transmitted on an optical fiber, each network element node on the transoceanic multiplex section shared protection ring is connected together through the optical fiber to transport services, and by virtue of the data communication channel, just like in a local area network, a network element node receives broadcast messages sent by other network elements through an optical interface port, and then forwards the broadcast messages to the cross-node service topology automatic discovery module on the system control board of the current network element to perform next processing.

Figure 4:
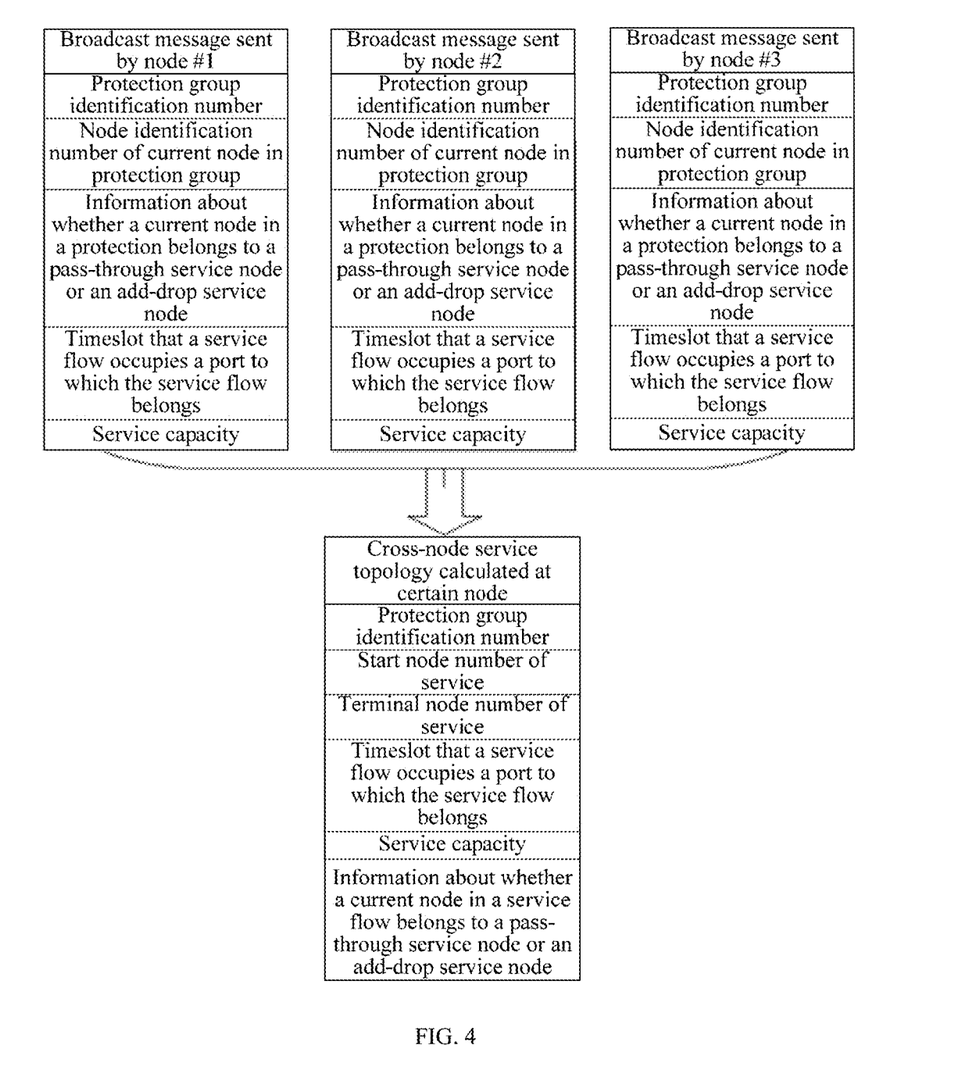
FIG. 4 illustrates a schematic diagram of a cross-node service topology output according to one embodiment of the present invention.
Figure 5:
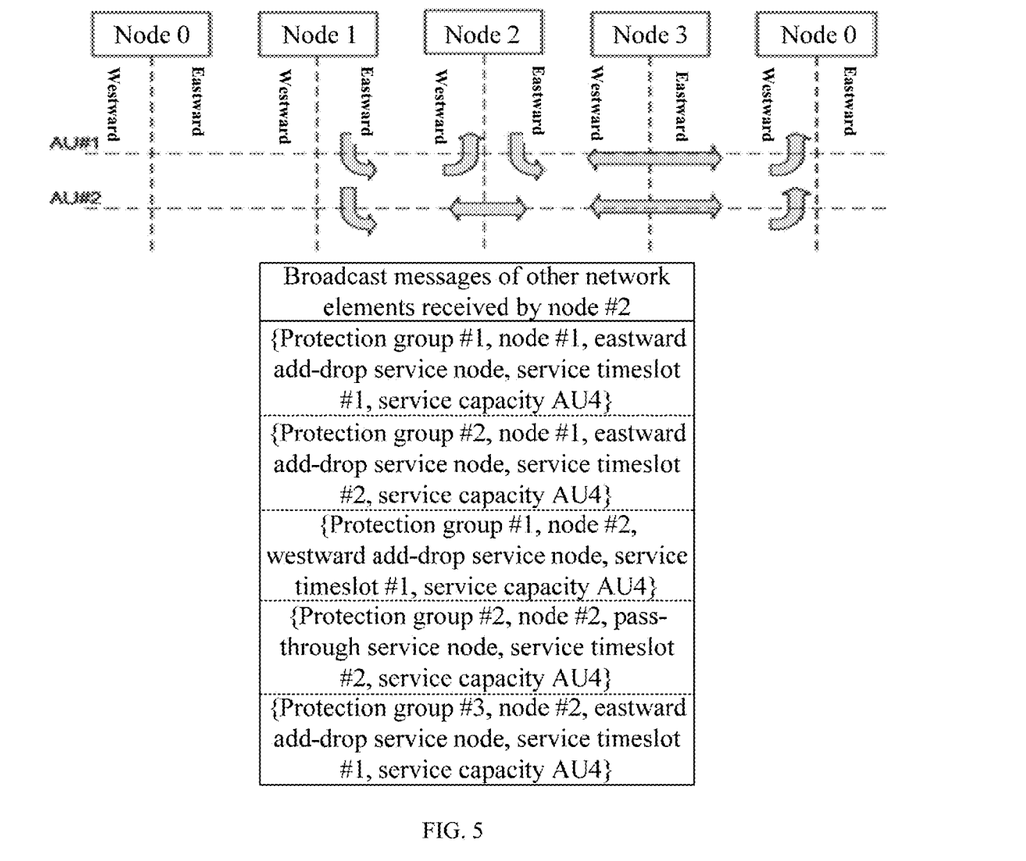
FIG. 5 illustrates a schematic diagram of a relation table that a topology automatic discovery module maintains according to a received broadcast message according to one embodiment of the present invention, wherein the relation table records local service flows on which network element nodes belong to the same cross-node service.
Figure 6:
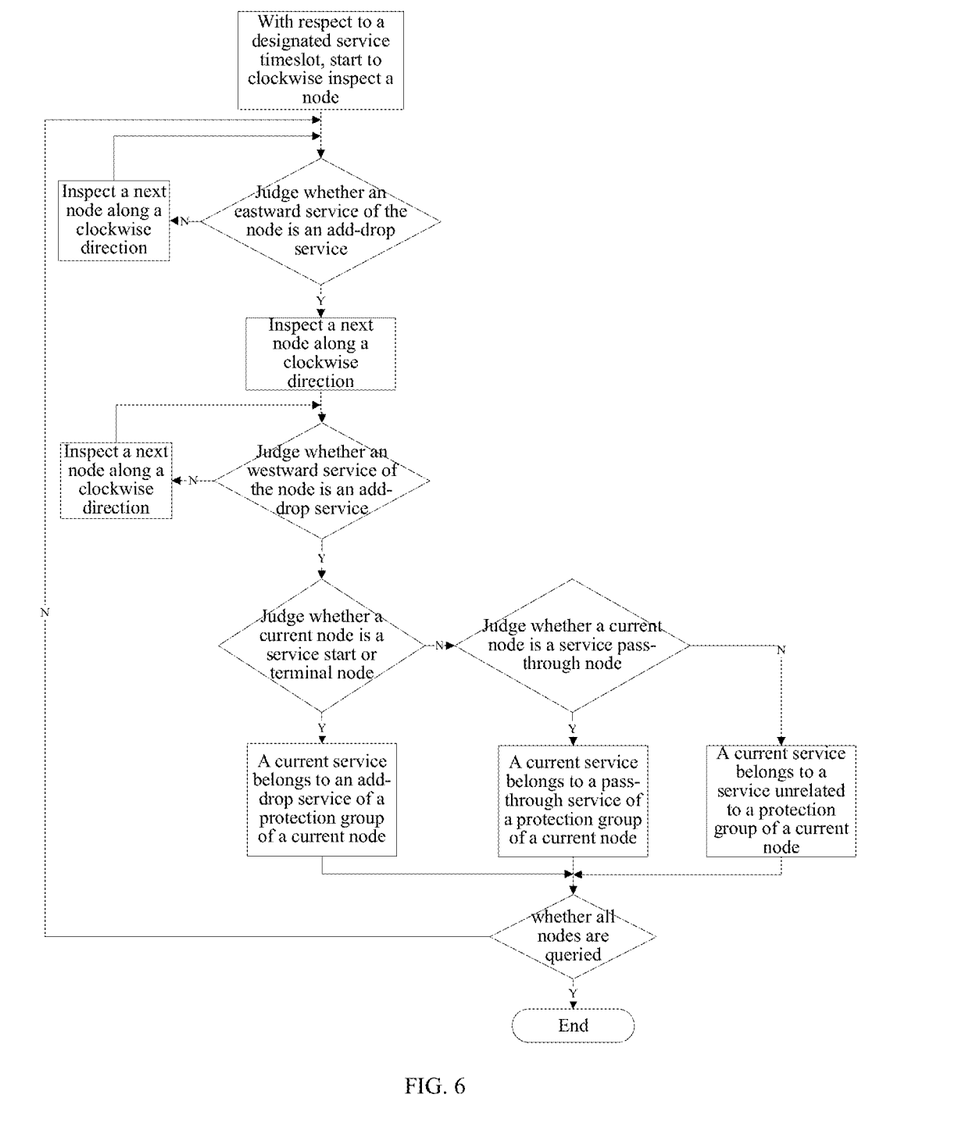
FIG. 6 illustrates a flowchart of path merging and connectivity calculation adopted by a topology automatic discovery module according to one embodiment of the present invention.
Figure 7:
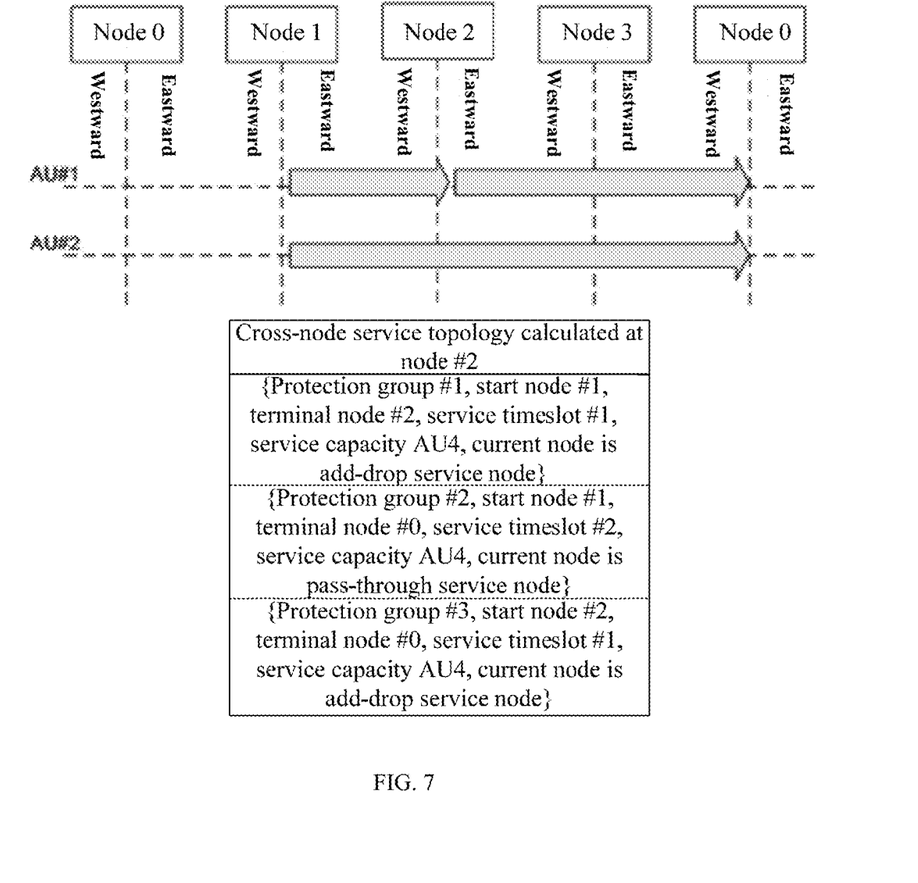
FIG. 7 illustrates a schematic diagram that a topology automatic discovery module outputs after processing the relation table in FIG. 5 according to the flowchart in FIG. 6 according to one embodiment of the present invention.

According to the embodiment of the present invention, the cross-node service flows on the transoceanic multiplex section shared protection ring may be classified according to the following classification rules: an identification of a transoceanic multiplex section shared protection ring protection group to which a cross-node service flow belongs, an identification of a start network element node, an identification of a terminal network element node, a service timeslot that a cross-node service occupies an interface port to which the cross-node service belongs, a service capacity and information about a current network element node in the cross-node service flow of the protection group belongs to a pass-through service node or an add-drop service node, as illustrated in FIG. 4. The service topology automatic discovery module may generate a cross-node service crossing topology from received service identification information messages broadcasted by other nodes according to the following steps: firstly, the topology automatic discovery module maintains a relation table according to the received broadcast messages, and records local service flows of which network element nodes belong to the same cross-node service, as illustrated in FIG. 5; and then, the following processing is performed to each service in the relation table according to the flowchart illustrated in FIG. 6: a type of network element node on each service is inspected according to a clockwise sequence, wherein if the network element node is an add-drop service node, the node is a root node of the cross-node service flow and is used as a start node of the cross-node service flow; if the network element node is a pass-through node, the service flows are merged into the same cross-node service flow, and continuously a next node is inspected according to a clockwise sequence till a next add-drop service node is found and used as a terminal node of the cross-node service flow; and the start node, the terminal node, the port timeslot and the service capacity can uniquely identify a cross-node service flow, as illustrated in FIG. 6, and a direction from the start node to the terminal node is a clockwise direction of the multiplex section shared protection ring. FIG. 7 illustrates a schematic diagram of output after processing the relation table in FIG. 5 according to the flowchart in FIG. 6 in the above-mentioned embodiment, wherein after a cross-node service is determined, the current network element node is marked according to information about whether the service belongs to an add-drop service, a pass-through service or an unrelated service, in order to make correct service-level ring protection switching actions when a fault occurs in the transoceanic multiplex section shared protection ring.

Figure 8:
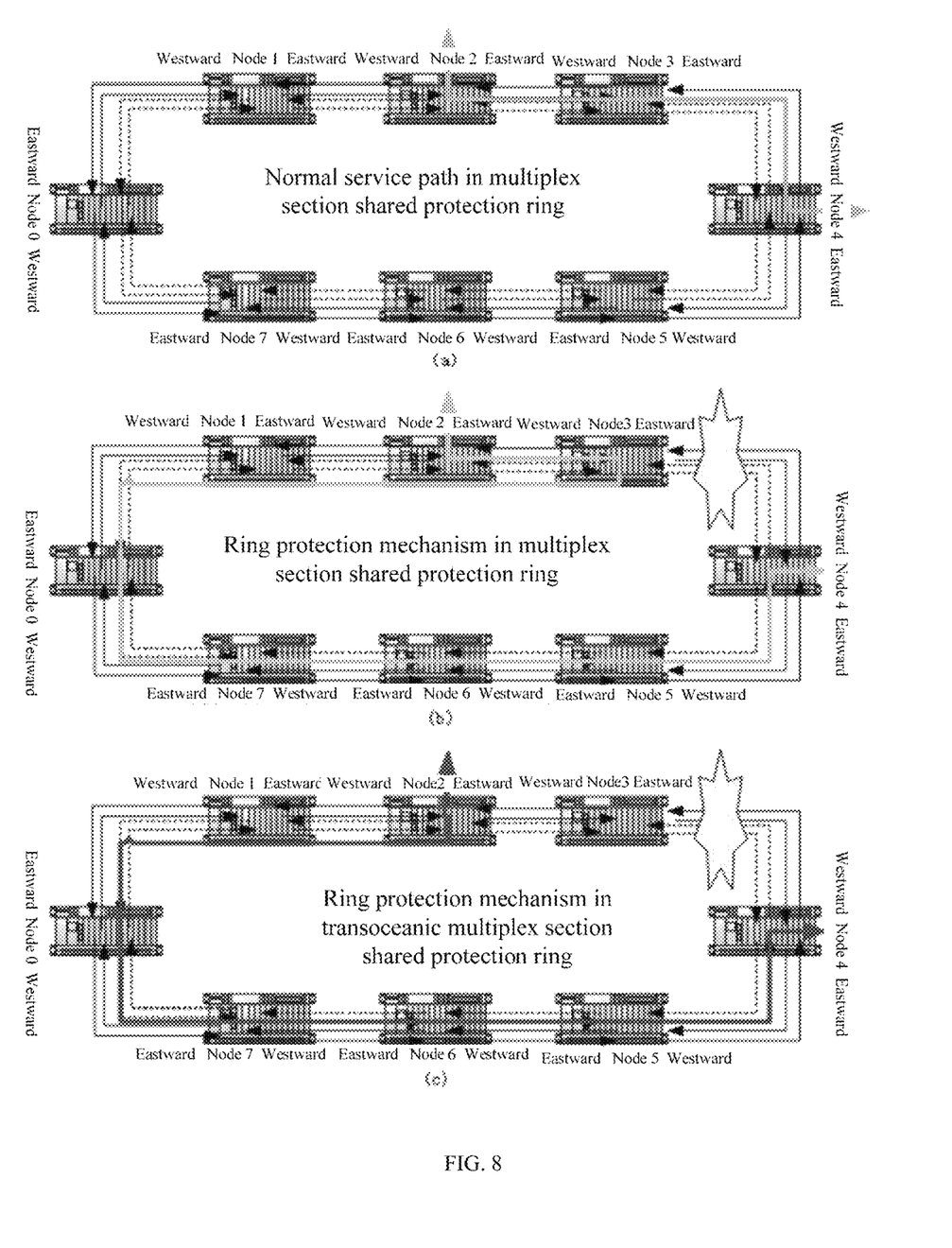
FIG. 8(a) illustrates normal service path of a transoceanic multiplex section shared protection ring.
FIG. 8(b) illustrates a mechanism diagram of an existing common protection mechanism in a transoceanic multiplex section shared protection ring.
FIG. 8(c) illustrates a mechanism diagram of a transoceanic multiplex section shared protection ring according to the present invention.

FIG. 8 illustrates three examples of application of a transoceanic multiplex section shared protection ring, wherein FIG. 8(a) illustrates normal service path of a transoceanic multiplex section shared protection ring. With respect to application of a transoceanic multiplex section shared protection ring that a physical distance between nodes are possibly very long, such as between network element node 2 and network element node 3, and between network element node 5 and network element node 6 which are spaced by an ocean as illustrated in FIG. 8(a), transmission time of a signal in an optical fiber between network element nodes is too long to be neglected. FIG. 8(b) illustrates a mechanism diagram of an existing common protection mechanism in a transoceanic multiplex section shared protection ring. During protection switching, if switching actions are performed according to a common multiplex section shared protection ring protection mechanism, the signals will be repetitively transmitted in a long path when the signals bypass the fault point, as illustrated by lines and arrows in FIG. 8(b), the signals will pass through long distance three times under severe situations, which will result in deterioration of the protection switching performance. FIG. 8(c) illustrates a mechanism diagram of a transoceanic multiplex section shared protection ring according to the present invention. The present invention optimizes the transoceanic multiplex section shared protection ring in mechanism, the protection switching actions are not uniform switching actions performed to all high-priority services at the switching node, instead, protection switching actions will be performed only to high-priority services which are influenced by the fault at an add-drop service node, and as illustrated by lines and arrows in FIG. 8(c), the signals pass through long distance once at most. For this reason, each node in the transoceanic multiplex section shared protection ring is required to understand all cross-node service topologies on the ring, such that correct service-level switching operations can be performed during protection switching. After the service topology is established, the protection switching actions are not uniform switching actions performed to all high-priority services at the switching node, but are protection switching actions performed only to high-priority services which are influenced by the fault at an add-drop service node.

The content protected by the present invention is not limited to the above-mentioned embodiments. Variations and advantages which can be considered by one skilled in the art without departing from the spirit and scope of the present invention shall be all included in the present invention, and shall be subject to the protection scope defined by the annexed claims.

What is claimed is:

1. A method for automatically discovering a cross-node service topology on a transoceanic multiplex section shared protection ring, a plurality of user equipments being accessed to the transoceanic multiplex section shared protection ring through network element nodes, each user equipment forming each network element node, characterized in that:

generating a broadcast message at one network element node, the broadcast message containing service identification information of the network element node, the service identification information being used for identifying a service flow configured for a protection group to which the network element node belongs, the service flow comprising add-drop service flow and pass-through service flow;

the network element node sending the broadcast message to all network element nodes through the transoceanic multiplex section shared protection ring;

network element nodes which acquire the broadcast message acquiring service identification information of other network element nodes from the broadcast message and determining a cross-node service crossing topology between the network element nodes; and when a network fault occurs in the transoceanic multiplex section shared protection ring, an add-drop network element node or a pass-through network element node in the service flow determining service-level ring protection switching according to the cross-node service crossing topology, the fault type and its position;

wherein the service identification information comprises a service mark and the broadcast message is generated according to the following steps:

comparing protection group information and service flow information configured by user equipment at the current network element node, if the service flow information is unrelated to all protection groups, abandoning the service flow information, and if the service flow information belongs to one of the protection groups, converting the service flow information into local service identification information of the protection group; and the local service identification information is classified into different service flows to enable each service identification information to correspond to one local service flow according to one or more of any combination of a plurality of the following information: a protection group identification number of a protection group to which the service flow belongs, a node identification number of the current network element node in the protection group, a service timeslot that the service occupies an interface port to which the service belongs, a service capacity and information about whether the service flow is terminated at the network element node to which the service flow belongs.

2. The method for automatically discovering the cross-node service topology on the transoceanic multiplex section shared protection ring according to claim 1, characterized in that modes for broadcasting the broadcast message to other network element nodes on the multiplex section shared protection ring comprise:

in-band communication, in which a data communication channel for transmitting management and control information between equipments in an optical synchronous digital hierarchy transmission network is used as a physical channel;

out-of-band communication, in which Ethernet interfaces between network element nodes are used as a physical channel and the content of the service identification information is packaged in an IP message and an Ethernet frame; and timed broadcasting or broadcasting by adopting point-to-point handshake protocols between network element nodes, in which the broadcast message is broadcasted to all other nodes only when a service flow configuration is changed at each time.

3. The method for automatically discovering the cross-node service topology on the transoceanic multiplex section shared protection ring according to claim 1, characterized in that a relation table is maintained at one or more of other network element nodes on the multiplex section shared protection ring, and the relation table is used for recording network element nodes that local service flows belong to the same cross-node service.

4. The method for automatically discovering the cross-node service topology on the transoceanic multiplex section shared protection ring according to claim 3, characterized in that the relation table determines the cross-node service crossing topology according to the message containing the service identification information according to the following steps:

after an update message containing the service identification information is received, inspecting local services of each network element node according to a clockwise sequence; and when the network element node is an add-drop service node of a service flow, marking the network element node as a root node of the cross-node service, and when the network element node is a pass-through node of a service flow, marking the node as a pass-through node of the cross-node service; and if the local services of a plurality of continuous network element nodes are connected end to end, merging the end-to-end connected local service flows into the same cross-node service, finding two root nodes of a cross-node service flow on the multiplex section shared protection ring along a clockwise direction, and representing the cross-node service flow using information of the two root nodes to obtain the cross-node service crossing topology; and topological information uses a following topological identification information to correspond to one cross-node service flow: a start network element node identification of the cross-node service flow, a terminal network element node identification, a service timeslot that the cross-node service occupies an interface port to which the cross-node service belongs, a cross-node service capacity and information about whether the cross-node service flow is terminated at the current network element node.

5. A device for automatically discovering a cross-node service topology on a transoceanic multiplex section shared protection ring, characterized in that the device comprises:

an optical transmitting and receiving module supporting optical synchronous digital hierarchy transmission network protocols, connected with a plurality of network element devices to form a transoceanic multiplex section shared protection ring and receive and transmit a service flow;

a configuration module supporting simple network management protocols or command-line interfaces, used for receiving a service and protection configuration made by a user to a current network node;

a cross-node service topology automatic discovery module, connected with the optical transmitting and receiving module and the configuration module and used for packaging the configuration made by the user to the current network element node into a broadcast message containing service identification information of the current node, broadcasting the broadcast message to other network element nodes in the transoceanic multiplex section shared protection ring through a data communication channel in the optical transmitting and receiving module or Ethernet interfaces between network element nodes, unpackaging messages containing service identification information of other nodes received from the data communication channel or the Ethernet interfaces and calculating a cross-node service crossing topology through a topology discovery method, the cross-node service crossing topology containing topological identification information which is capable of uniquely identifying a cross-node service flow; and wherein the optical transmitting and receiving module is located on a line board and comprises an SDH transmission module, a service processing module, a protection protocol processing module, a service crossing matrix, an APS hardware channel and a general-purpose processor;

and an optical synchronous digital hierarchy transmission network service enters the optical transmitting and receiving module through an optical fiber, photoelectric conversion is performed by the SDH transmission module to convert an optical signal into an electrical signal, the service processing unit separates service data and overhead bytes from the electrical signal, the overhead bytes which are needed by the protection protocols are transmitted into the protection protocol processing module for protection calculation through the APS hardware channel, and the service data enter the service crossing matrix for switching.

6. The device according to claim 5, characterized in that the configuration module is located on a system control board and comprises an SNMP client supporting simple network management protocols, a command-line interface processing module, an SDH crossing configuration module and a protection configuration module; and a configuration of the current network element issued by the user is transmitted to the configuration module on the system control board through an SNMP message or a command-line interface, configuration parameters are extracted after protocol processing and are transmitted to the corresponding configuration module, the crossing configuration module maintains all service crossing configurations of the current network node and the protection configuration module maintains all multiplex section shared protection ring production group configuration information of the current network element node.

7. The device according to claim 5, characterized in that the cross-node service topology automatic discovery module unpackages messages containing service identification information broadcast by other network element nodes from the overhead bytes of the synchronous digital hierarchy transmission network service, the cross-node service crossing topology is calculated through the topology discovery method, a protection protocol processing module is notified if the topology is changed, and the protection protocol processing module recalculates a protection state once based on a new topology to decide whether to reconfigure a protection switching action.

* * * * *